United States Patent [19]

Millington

[11] Patent Number: 4,722,434

[45] Date of Patent: Feb. 2, 1988

[54] SCRAPER CHAIN CONVEYORS

[75] Inventor: Michael J. Millington, Kidderminster, United Kingdom

[73] Assignee: Parsons Controls Limited, Warchestershire, England

[21] Appl. No.: 347,943

[22] Filed: Feb. 11, 1982

[30] Foreign Application Priority Data

Nov. 2, 1981 [GB] United Kingdom ................ 8132975

[51] Int. Cl.[4] ............................................. B65G 19/00
[52] U.S. Cl. ..................................................... 198/731
[58] Field of Search ......................................... 198/731

[56] References Cited

U.S. PATENT DOCUMENTS

| 4,105,110 | 8/1978 | Braun et al. | 198/731 |
| 4,113,084 | 9/1978 | Temme | 198/731 |
| 4,320,620 | 3/1982 | Rieger et al. | 198/731 |

FOREIGN PATENT DOCUMENTS

| 2134403 | 1/1973 | Fed. Rep. of Germany | 198/731 |
| 276794 | 9/1927 | United Kingdom | 198/731 |
| 864296 | 3/1961 | United Kingdom | 198/731 |

Primary Examiner—Joseph F. Peters, Jr.
Assistant Examiner—Stephen P. Avila
Attorney, Agent, or Firm—Solon B. Kemon

[57] ABSTRACT

Attachment of a scraper member—such as a flight bar 14 (FIG. 8) to a scraper conveyor chain 2 moving in pans 12 is effected by means of a land 42 formed on an extension 36 of the flight bar seating in a chain link 44. The driving force of the chain is transmitted to the flight bar through the land and no loading is transmitted to a retaining finger piece 50 bolted to the flight bar using a square headed bolt 34 captive against a shoulder on the flight bar. The retaining finger piece is symmetrical and hence reversible. In another embodiment, a short saddle piece serving as a race cleaner and chain support may also be secured to the chain by means of a land co-acting with the chain and retained on the chain by means of retaining pins.

1 Claim, 11 Drawing Figures

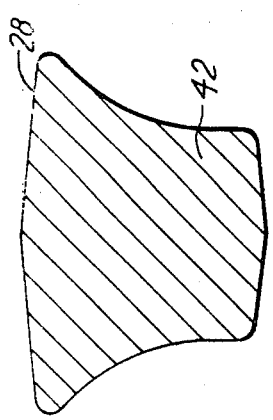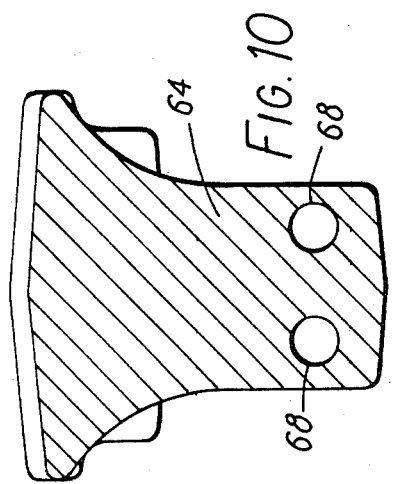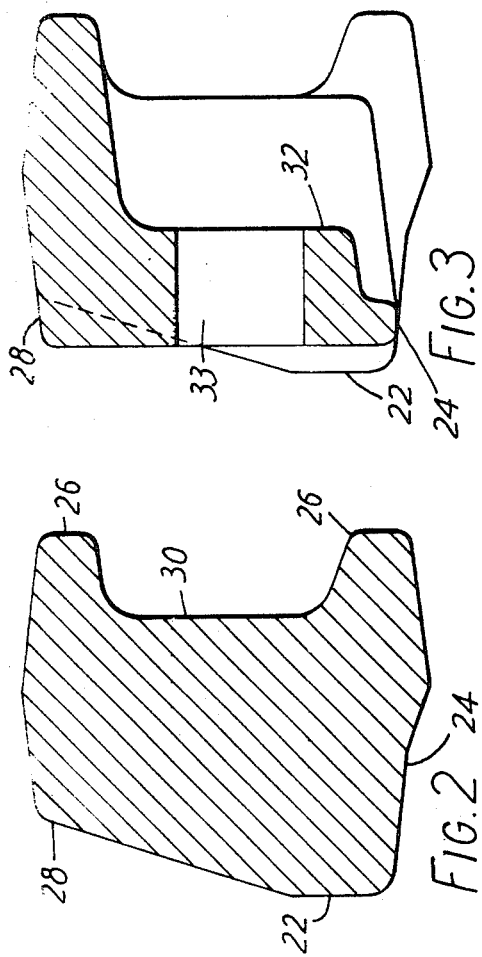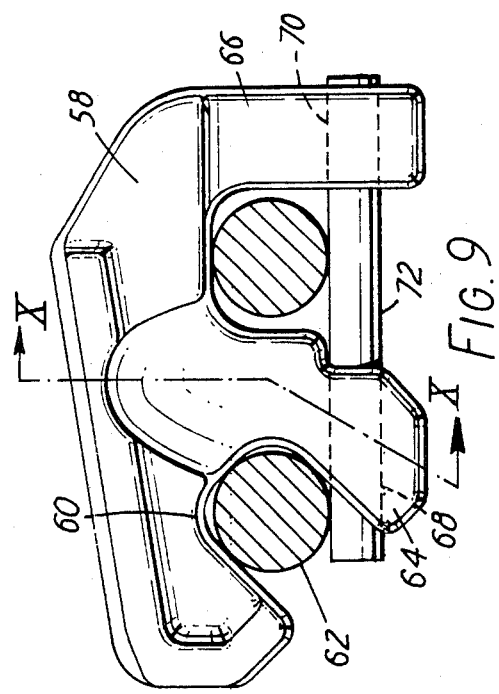

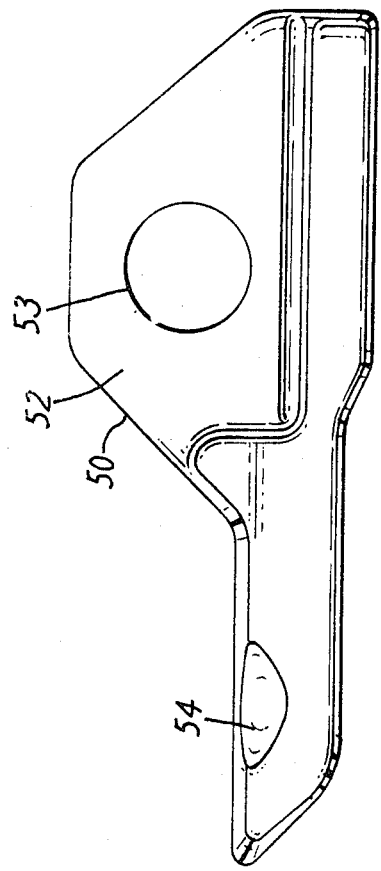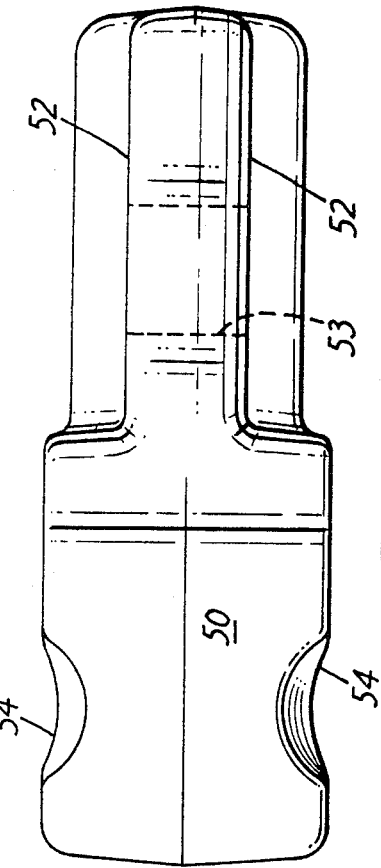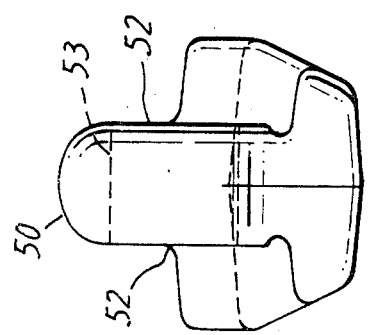

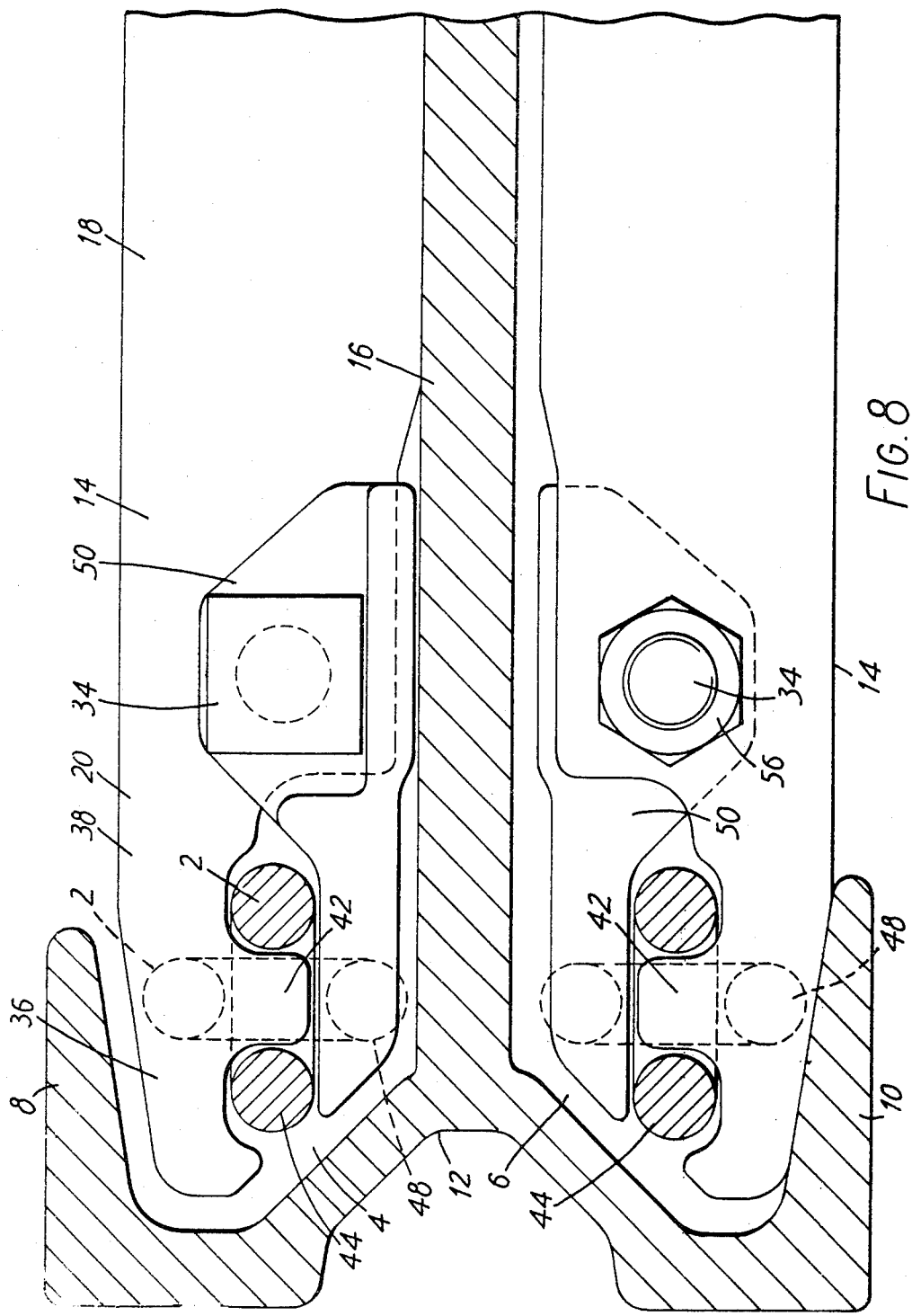

SCRAPER CHAIN CONVEYORS

DESCRIPTION

This invention relates to scraper chain conveyors and, more particularly, to scraper chain conveyors used to move particulate material, such as coal, along troughs or pans having inwardly lipped side flanges accommodating the conveyor chains.

According to the present invention there is provided scraper members for scraper chain conveyors having attachment means including a land extending from the attachment means and arranged to seat in a link of chain extending parallel to the direction of scraping movement and retaining means adapted to co-act with the attachment means to retain the chain link in engagement with the land.

The invention will now be described, by way of example, with reference to the accompanying drawings, in which:

FIGS. 2,3 and 4 are cross-sections of the flight bar taken on the lines II—II, III—III and IV—IV respectively;

FIG. 5 is an elevation of a finger piece for attachment to the flight bar;

FIGS. 6 and 7 are respectively an end elevation and a plan view of the finger piece;

FIG. 8 is a cross-sectional elevation of a portion of a conveyor pan together with portions of flight bars assembled on to an endless conveyor chain;

FIG. 9 is an elevation of a saddle piece for attachment to the endless conveyor chain; and FIG. 10 is cross-section of the saddle piece taken on the lines X—X of FIG. 9.

Figures 1A, 1B:
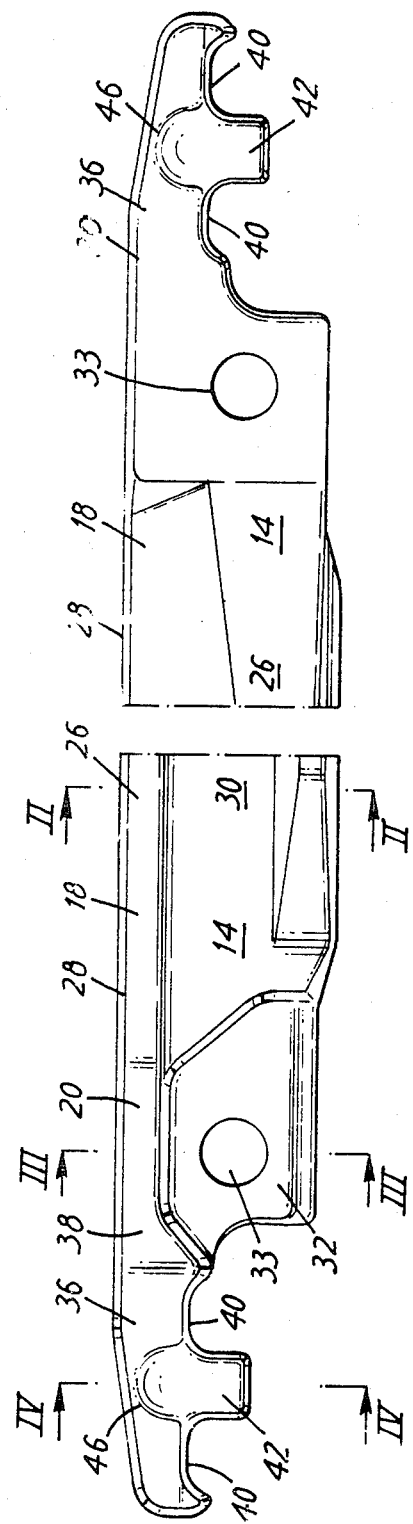
FIG. 1A is a front elevation and FIG. 1B is a rear elevation of a flight bar.

As indicated in FIG. 8, a scraper chain conveyor includes a pair of endless chains 2, one only of which is shown, passing over end sprocket wheels (not shown) and running in upper and lower races 4, 6 formed by inwardly directed flanges 8, 10 on pans 12 extending the length of the conveyor.

Flight bars 14 are positioned at intervals along the pairs of chains to extend perpendicularly between the chains with the bars in the upper race 4 of the conveyor being carried along in contact with the web plates 16 of the pans 12 to draw coal alongthe uppe race.

As shown in FIGS. 1A, 1B, 2, 3 and 4, each flight bar 14 includes a central portion 18 and end portions 20. The central portion 18 is of a generally square cross-section tapered back from a lower part of the trailing edge 22. The base 24 of the bar has a 20° taper from the lower part of the trailing edge to the mid-plane and then a 10° taper up to the leading edge 26. The top 28 of the bar has a 65° taper from the lower part of the trailing edge to well aft of the mid-plane and then a 10° taper up to the leading edge. The leading edge is formed with a recess 30 intermediate to the top 28 and the base 24 of the bar.

Each end portion 20 extends smoothly from the central portion but is partially cut-away at the front adjacent the central portion to form a flat face 32 which is drilled with a bore 33 to receive a square headed retaining bolt 34 (FIG. 8). Extensions 36 of the upper portions 38 of the end portion 20 are formed with lower faces 40 conforming to the chain links, a land 42 extending downwardly seating in a first link 44 (FIG. 8) of chain extending parallel to the web plate 16 and edge recesses 46 accommodating the adjoining chain links 48 (FIG. 8) perpendicularly disposed to the first link 44.

As shown in FIGS. 5, 6 and 7 a finger piece 50 is formed to complement the extension 36 of the end portion 20 and is provided with flat faces 52 one or other of which mates with the flat face 32 in the end portion and is also drilled with a bore 53 to permit passage of the square headed retaining bolt 34. Edge recesses 54 are formed in the finger pieces to accommodate the chain links 48 adjoining the first link 44.

To assemble a flight bar 14 onto the pair of conveyor chains 2, the finger pieces 50 are slid on the web plate 16 below corresponding horizontal chain links in the upper run and the flight bar 14 lowered to engage the finger pieces 50 and seat upon the chain. Square headed retaining bolts 34 are then inserted to extend through the finger pieces and the end portion 20 with the square heads butting against shoulders on the finger plates and nuts 56 respectively tightened thereupon to secure the finger pieces to the flight bar.

It will be appreciated that the finger pieces 50 merely serve to retain the flight bar in contact with the chain and do not transmit the drive force, which is taken either on the land 42 or on the rear face of the extension 36.

Taken together, the end portions 20 and the finger pieces 50 approximate in cross-section to the cross-section of the central portion of the bar, thereby tending to preclude accumulation of coal particles adjacent the flanges of the pans. Furthermore, the finger pieces are symmetrical and thus reversible, thereby being attachable to either end portion of the flight bar.

As shown in FIGS. 9 and 10 additional saddle pieces 58, approximately in shape to the extensions 36 of the end portion 20 of the flight bars 14 are secured to the conveyor chains at intervals intermediate the flight bars. Each additional saddle piece 58 is formed as a saddle 60 conforming to a horizontally disposed link 62 of chain with a central land 64 extending downwardly through the link of chain. An outer, downwardly extending, side flange 66 also conforms to the link of chain. Two, aligned, pairs of holes 68, 70 are drilled through the land and the side flange to receive pins 72 extending tangentially of the underside of the link of chain and serving to retain the additional saddle piece on the link of chain.

In operation, the additional saddle pieces 58 are positioned on the conveyor chains and serve to lift the chain clear of the web plate 16. In motion, the additional saddle pieces serve to sweep coal particles out of the flanged portions of the pans and thereby reduce the possibility of accumulation of coal particles in that region. As with the flight bars, the drive force is taken either on the land 64 or on the rear face of the saddle 60 and the pins 72 merely serve to retain the additional saddle piece on the link of chain.

I claim:

1. In or for a scraper chain conveyor adapted to move in troughed pans, a scraper member comprising a flight bar having a central portion of generally square cross-section with reduced end portions, said flight bar being chamfered to facilitate movement thereof along said pans, said flight bar having integrally formed end portions with attachment means, said attachment means including a land extending perpendicularly from said flight bar and adapted to seat onto horizontal chain links of a pair of chains to transmit forces between said flight bar and said chains, said flight bar being formed adjacent said attachment means with an upright web portion of substantially reduced thickness in relation to the remainder of the flight bar, retaining means having a finger piece adapted to coact with said attachment means to retain the horizontal links of said chain in engagement with said land, said finger piece being formed with opposed flat faces each adapted to mate with the reduced portions of said flight bar, each retaining means being symmetrical and reversible about a central plane perpendicular to the direction of motion of the conveyor to permit attachment at either end portion of the flight bar, the reduced portion of said flight bar and the finger piece of said retaining means being formed with bores there through in co-axial alignment, a bolt having a head, said bolt extending through said co-axial bores, a nut engageable with said bolt and contacting a face on said upright web portion of said flight bar remote from said retaining means to effect urging of said retaining means into engagement with said upright web portion, and a shoulder formed on said retaining means adjacent the bore co-acting with the head of the bolt to restrain rotation thereof.

* * * * *